March 3, 1970  P. A. AVERY  3,498,056
PRESSURIZING AND DRAIN VALVE
Filed April 3, 1968

INVENTOR.
PAUL A. AVERY
BY
ATTORNEYS.

United States Patent Office  3,498,056
Patented Mar. 3, 1970

3,498,056
PRESSURIZING AND DRAIN VALVE
Paul A. Avery, Shelton, Conn., assignor to Avco Corporation, Stratford, Conn., a corporation of Delaware
Filed Apr. 3, 1968, Ser. No. 718,612
Int. Cl. F23n 5/24; F02c 9/00; F16k 23/00
U.S. Cl. 60—39.09                                8 Claims

ABSTRACT OF THE DISCLOSURE

The disclosure illustrates a pressurizing and drain valve in a gas turbine engine fuel control system to maintain fuel system pressures at a level sufficient for proper operation and to permit a rapid drain of fuel from the fuel system nozzles upon shutdown to prevent coking of the fuel in the nozzles and manifolds. The valve includes a pair of valve elements displaceable relative to one another and to the valve body so that when the valve inlet pressure drops below a given level, the flow from the inlet to the valve outlet is blocked and simultaneously the outlet is connected to a drain outlet through a relatively unobstructed flow path to permit a rapid draining of fuel from the fuel system nozzles.

---

Figure 1:
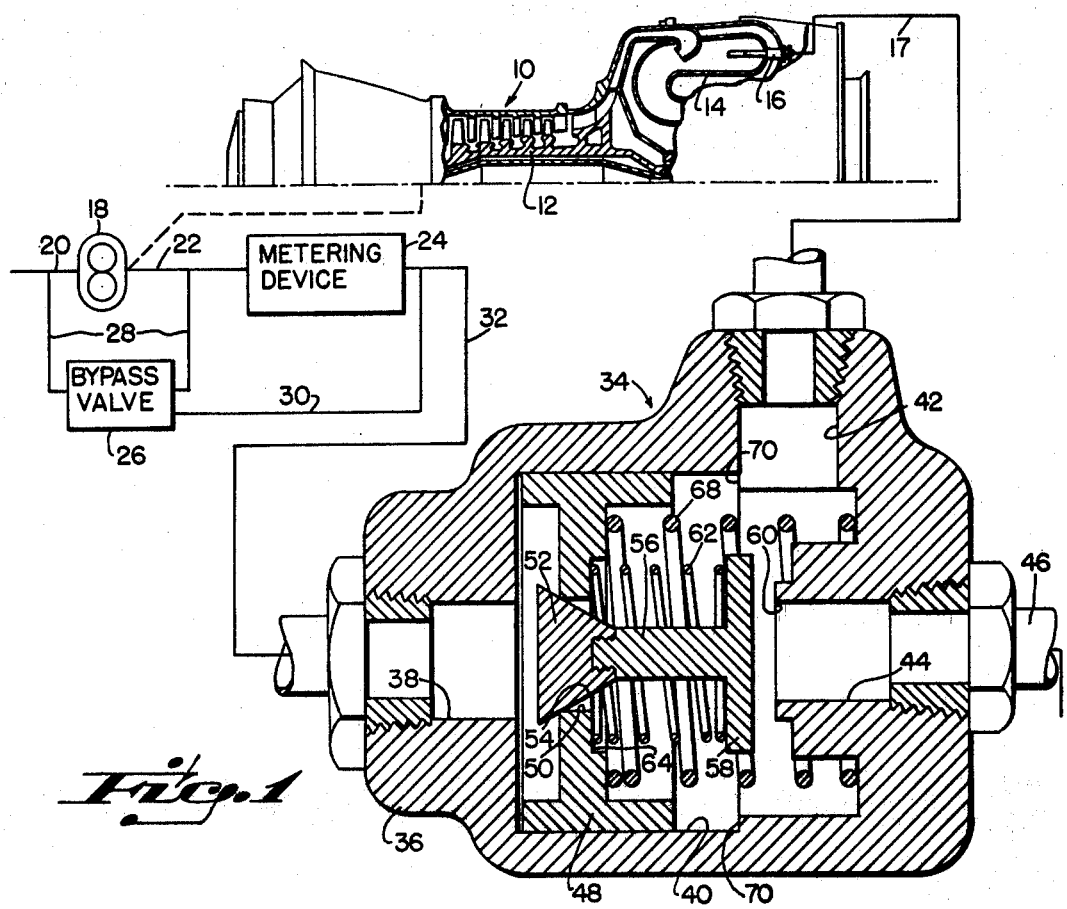

The present invention relates to flow control devices and more specifically to pressurizing and drain valves.

A typical environment for a pressurizing drain valve is found in the fuel control system of a gas turbine engine. The fuel control system for the gas turbine engine generally comprises an engine-driven fuel pump which pressurizes fuel for delivery via a metering system to nozzles positioned in a combustor of the gas turbine engine. The metering system controls flow of fuel delivered to the nozzles and injected into the combustor for combustion with pressurized air. The flow rate is a function of operation demand and a number of operating parameters to provide optimum engine performance. Generally, one of the characteristics of the fuel metering system is that it requires at least a minimum downstream pressure to provide proper operation. This requirement presents a problem at relatively low flow rates because the fuel nozzles offer insufficient restriction to create a pressure downstream of the metering device that is at a level necessary for proper operation.

The pressurizing and drain valve, therefore, is used downstream of the fuel metering device to provide a higher restriction to flow than that offered by the nozzles at low rates. These valves, in addition to maintaining the fuel metering system pressures at a minimum level, function to drain fuel from the nozzles when the gas turbine engine is shut down. If this is not done the fuel remaining in the nozzles tends to expand and coke due to the high combustor temperature remaining after termination of combustion. It is apparent that repeated coking can have an extremely degrading effect on the performance of the engine.

While a number of pressurizing and drain valves have been proposed to provide these functions, they are generally quite complex because of their dual function nature. In addition, many pressurizing and drain valves may not rapidly drain fuel from the nozzles upon engine shutdown, thereby encouraging coking.

Accordingly, the object of the present invention is to provide a highly simplified, effective, economical and rapid-operating pressurizing and drain valve for use in a fluid flow system such as a gas turbine fuel system.

In broader aspects of the present invention the above ends are provided by a pressurizing and drain valve which is used with a fluid supply system comprising means for delivering a supply of fluid to a discharge point. The pressurizing and drain valve comprises a housing for a first passageway which extends from an inlet end connecting with the delivery means to an outlet end connecting with the discharge point. A second passageway extends from the first passageway to a drain outlet in the valve housing. A displaceable first valve element is positioned in the first passageway so that it is exposed on one side to inlet fluid pressures and upstream from the second passageway. A second valve element is carried by the first valve element and is relatively displaceable in an upstream direction to provide in combination a variable flow path through the first passageway. The second valve element is adapted to be urged by inlet fluid pressures into a position where the first and second valve elements block fluid flow through the first passageway. A means is carried by the second valve element for simultaneously blocking flow from the first passageway to the second passageway and urging the second valve element upstream relative to the first valve in response to a given downstream displacement of the valves by inlet fluid pressures. A means for yieldably urging the first valve element in an upstream direction is provided so that the outlet is connected to the drain outlet in response to an upstream fluid pressure below a given level.

The above and other related objects and features of the present invention will be apparent from a reading of the description of the disclosure found in the accompanying drawing and the novelty thereof pointed out in the appended claims.

Figure 2:
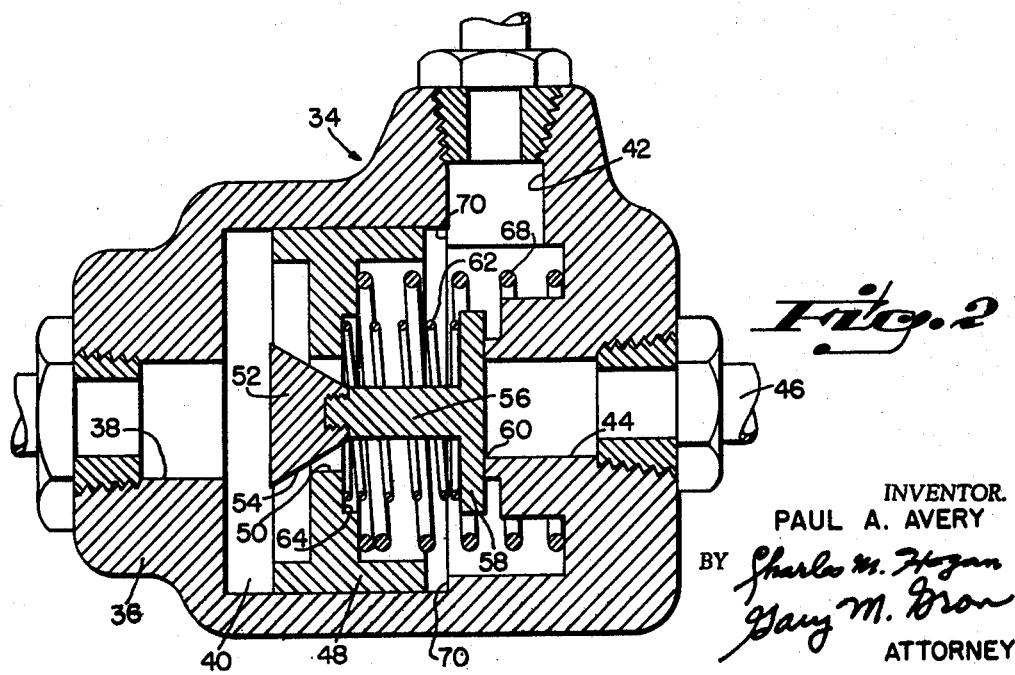

In the drawing:
FIGURE 1 is a longitudinal section view of a pressurizing and drain valve embodying the present invention, together with a simplified gas turbine engine and fuel control system with which the pressurizing and drain valve may be used, the valve being shown in non-operative position;
FIGURE 2 is a longitudinal section view of the valve shown in FIGURE 1 in an operating position.

Referring specifically to FIGURE 1 there is shown a fuel control system for a gas turbine engine 10 which the pressurizing and drain valve may be used. The engine 10 includes a rotatable compressor 12 for receiving inlet air and pressurizing it for delivery to a combustor 14. Fuel is injected into the combustor 14 through nozzles 16 from a supply conduit 17 and the resultant mixture is ignited by suitable means for providing a propulsive gas stream. This propulsive gas stream may be used to provide a pure reaction thrust for the engine 10 or may be used to drive a power turbine which then provides a rotatable power output.

Fuel to the nozzle supply conduit 17 is provided by a fuel control system which comprises an engine-driven fuel pump 18, generally driven by a forward gear assembly (not shown) connected to the rotatable compressor 12. The fuel pump 18 receives fuel from a fuel tank (not shown) via an inlet conduit 20 and pressurizes it for delivery through a discharge conduit 22 to a fuel metering device 24. While the fuel metering device 24 may take many different forms, it essentially comprises a variable orifice having a flow area controlled by a servo mechanism. The servo mechanism is responsive to a number of control inputs, e.g. operator demand, engine rotational speed, compressor discharge pressure, etc. The fuel flow is made a direct function of the area of the valve orifice by maintaining a constant pressure drop thereacross.

To accomplish this end, a bypass valve 26 is interposed in a conduit 28 extending from the high to the low pressure side of the fuel pump 18. The bypass valve 26 receives fuel pressure signal inputs from metering device discharge conduit 32 via a conduit 30. The bypass valve 26 controls the flow of high pressure fuel around the pump 18 to maintain the pressure in conduit 22 a predetermined level above the pressure in outlet conduit 32.

As stated previously, fuel metering systems generally require a minimum downstream pressure to provide proper operation thereof. As herein illustrated, low fuel back pressures require excessively large flow areas in the valve 26 and cause slow response in all fuel systems components operated by hydraulic servo pistons. In addition, the fuel at low pressure in the fuel control discharge pipe is prone to vaporization in the high temperature zone surrounding the engine. All these effects are deleterious to the normal operation of the engine control system. While the fuel nozzles 16 provide a sufficient restriction or back pressures at high flow rates to maintain this minimum pressure, they are incapable of doing so at relatively low rates of flow. It is for this purpose that the pressurizing and drain valve 34 is provided.

The pressurizing and drain valve 34 comprises a housing 36 having a flow path from the metering device to the nozzles 16. The flow path comprises an inlet passageway 38 extending from conduit 32 to a chamber 40. An outlet passageway 42 extends from a downstream portion of the chamber 40 to the nozzle supply conduit 17. A drain passageway 44 extends from a downstream portion of the chamber 40 to a conduit 46 extending to a suitable overboard drain point.

A first valve element 48 is displaceable in the chamber 40 and has a generally central opening 50 through which a second valve element 52 extends. The valve element 52 comprises a frusto conical element having an upstream base diameter larger than the diameter of the opening 50. The downstream diameter of element 52 is substantially less than the opening 50 and is threaded onto a generally cylindrical extension portion 56. A poppet valve element 58 is carried by the extension portion 56 in a position to selectively block or permit flow through an inlet end 60 of the drain passageway 44.

The valve element 52 is displaceable relative to the valve element 48 in an upstream direction to provide a variable flow area from the inlet passageway 38 to the outlet passageway 42. The valve 52 is urged downstream to a closed position by a relatively light return spring 62, acting on a recess 64 in the downstream side of valve 48 and on the poppet valve element 58. In addition, the upstream inlet pressures act on the frusto conical portion 54 of the valve element 52 in a downstream direction to cooperate with the valve element 48 to block flow through the conduit 32, as herein illustrated. The valve element 48 is urged in an upstream direction by a relatively heavy spring 68 against the action of the upstream inlet fluid pressure. An annular shoulder 70 in the chamber 40 limits the downstream displacement of the valve element 48 in response to fluid pressures.

When the valve is in an inoperative position, as shown in FIGURE 1, the return spring 62 urges the valve element 52 in a relative downstream direction, thus causing the valve elements 48 and 52 to block flow through the chamber 40. At the same time, spring 68 urges valve 48 and valve 52 away from the inlet end 60 of the drain passageway 44 to provide a relatively unobstructed flow path from the outlet passageway 42 to the drain passageway 44. When the engine 10 is started, flow to the inlet passageway 38 of the valve 34 produces a build-up of pressure on the upstream faces of the valve elements 48 and 52. Thus, as inlet pressure builds up the valve elements 48 and 52, in addition to being urged to a relative closed position, are displaced in a downstream direction against the action of the spring 68. When the valve elements have been displaced a predetermined downstream distance, as shown in FIGURE 2, the poppet valve element 58 blocks off the inlet 60 to the drain passageway 44, thus blocking flow from the outlet 42 to the drain 44. Simultaneously, a flow path from the inlet passageway 38 to the outlet passageway 42 is provided by a displacement of the valve element 52 upstream relative to the valve element 48. This results because further downstream displacement of the valve 52 is prevented by the abutment of the inlet 60 by the poppet valve 58. The valve 48, however, continues to be displaced in a downstream direction by the action of the inlet fluid pressures against the action of the spring 68.

At this point flow is established from the fuel metering device 24 to the fuel nozzles 16. As is apparent to one skilled in the art, the spring constants and the valve areas may be selected to provide a predetermined pressure level at which drain flow is blocked and nozzle flow simultaneously permitted. Furthermore, the force of the return spring 62 may be selected to stabilize the action of valves 52 and 48 relative to one another. It should be noted that the frusto conical shape of the valve 52 provides in combination with the opening 50 of the valve 48 a flow area which has a relatively small increase of flow area for relative displacement of the valve elements from a closed position. This low rate of flow area increase greatly enhances the stability of the valve around the operating point at which flow to the nozzles is established, thus preventing chattering and unwanted oscillations. In contrast, the downstream portion of the conical valve element 52 provides in combination with the valve element 48 a relatively unobstructed flow path from the inlet to the outlet of the valve when the valve element 48 is displaced against the shoulder 70. This factor helps to lower the maximum downstream pressures to which the fuel metering device may be exposed, thereby enhancing the reliability of the system.

It should be noted that by suitable choice of cone angle on the element 52 and by variation of the spring properties, any pressure drop versus flow characteristic may be generated by the valve, allowing the most favorable back pressure schedule to be imposed on the fuel metering device.

During normal operation the pressurizing and drain valve operates at low pressures to offer a sufficient restriction in the fuel supply line for minimum operating pressures. When the engine is shut down the fuel flow level rapidly decreases and the downstream pressure of the metering device 24 decreases. In response to the lowered inlet pressures spring 68 urges valve 48 in an upstream direction. As the pressure continues to fall off towards the predetermined minimum pressure set by the selection of spring constants and valve areas, the valve element 48 approaches valve element 52 to block further flow from the inlet passageway 38 to the outlet passageway 42. When the inlet pressure goes below the predetermined minimum the spring 68 urges valve element 48 to contact with valve 52, thus eliminating further nozzle flow and simultaneously lifting the poppet valve element 58 from the drain inlet 60. Flow is then permitted from the nozzle supply conduit 17 to the drain passage 44 immediately upon the attainment of the minimum system operating pressure. It should be noted that since the poppet valve 58 has a rather short stroke and provides an uninterrupted annular flow path, a relatively low resistance flow path is rapidly established when the engine is shut down.

As stated previously, the minimum system pressure at which the drain flow is established can be changed by a selection of springs and valve areas. It should be noted that the minimum operating pressure can preferably be set at such a level that the compressor 12 is still rotating after termination of combustion when the fuel system drain pressure is reached. Because a drain flow path is rapidly established, the pressurized air in the combustor creates a back pressure on the nozzles 16 which forces the fuel through the nozzle supply conduit 17 and out the drain conduit 46. This feature is highly effective in insuring that substantially all residual fuel is removed from the nozzles in the combustor 14.

While the preferred embodiment of the present invention has been described, it is apparent to those skilled in the art that modifications may be accomplished without departing from the spirit of the present invention.

Having thus described the invention, what is claimed as novel and desired to be secured by Letters Patent of the United States is:

1. A pressurizing and drain valve for use with a fluid supply system comprising means for delivering a supply of fluid to a discharge point, said pressurizing and drain valve comprising:

a housing having a first passageway therethrough, said passageway having an inlet end for connecting with said delivery means and an outlet end for connecting with said discharge point;

said housing having a second passageway extending from said first passageway to a drain outlet;

a first valve element displaceable in said first passageway upstream from said second passageway and being exposed on one side to inlet fluid pressures;

a second valve element carried by said first valve element and displaceable relative thereto in an upstream direction to provide in combination therewith a variable flow path through said first passageway, said second valve element is adapted to be urged by inlet fluid pressures into a position wherein the variable flow path formed by said first and second valve elements is closed to block fluid flow through said first passageway;

a poppet valve element carried by said second valve element for simultaneously abutting the inner end of said second passageway to block flow from said first passageway to said second passageway and urge said second valve element upstream relative to said first valve element in response to a given downstream displacement of said valves by inlet fluid pressures; and means for yieldably urging said first valve element in an upstream direction so that a relatively unobstructed flow path from the outlet end of said first passageway to said drain outlet is provided in response to an upstream fluid pressure below a given level.

2. A pressurizing and drain valve as in claim 1 wherein: said first valve element has an opening therein;

said second valve element extends through said opening, said second valve element being shaped to form a relatively small flow area for relative displacement of said valve element from a closed position and to form a relatively large flow area for substantial relative displacement of the valve elements;

whereby the stability of the valve element at relatively low flow rates is substantially increased.

3. A pressuring and drain valve as in claim 2 wherein: said first valve element has a cylindrical opening therein;

said second valve comprises a frusto conical element having an upstream base diameter larger than the opening in said first element, said second valve element having a downstream a diameter substantially less than the opening in said first valve element;

whereby the stability of said valve elements relative to one another is enhanced.

4. A pressurizing and drain valve as in claim 3 further comprising:

means for yieldably urging said first and second valve elements to a closed position, whereby the relative stability of said valves is further enhanced.

5. A pressurizing and drain valve for a gas turbine engine having a rotating compressor for pressurizing and supplying air to a combustor having nozzle means to injet fuel therein for combustion with said air, said engine further including a fuel supply system including means for metering a supply of fuel and conduit means for connecting said metered fuel to said nozzle means, said metering mean requiring a predetermined minimum pressure for proper combination thereof, said engine being of the type in which said compressor continues to rotate and pressurize air for a period of time after combustion in said combustor has terminated, and wherein said pressurizing and drain valve comprises:

a housing interposed in said conduit means between said metering means and said nozzle means having a first passageway therethrough, said passageway having an inlet end for connecting with said metering means and an outlet end for connecting with said nozzle means;

said housing having a second pasageway extending from said first passageway to a drain outlet;

a first valve element displaceable in said first passageway upstream from said second passageway and being exposed on one side to inlet fluid pressures;

a second valve element carried by said first valve element and displaceable relative thereto in an upstream direction to provide in combination therewith a variable flow path through said first passageway, said second valve element is adapted to be urged by inlet fluid pressures into a position wherein the variable flow path formed by said first and second valve elements is closed to block fluid flow through said first passageway;

a poppet valve element carried by said second valve element for simultaneously abutting the inner end of said second passageway to block flow from said first passageway to said second passageway and urge said second valve element upstream relative to said first valve element in response to a given downstream displacement of said valves by inlet fluid pressures; and means for yieldably urging said first valve element in an upstream direction comprising a spring having a spring constant that provides an opening pressure sufficiently high to connect said valve outlet and said nozzle means to said drain point before said engine has terminated rotation, thereby causing pressurized air to force fuel upstream from said nozzle means to said drain point.

6. Apparatus as in claim 5 wherein:

said first element has a cylindrical opening therein;

said second valve element extends through said opening and has a frusto conical shape having an upstream base diameter larger than said opening and a diameter substantially smaller than the diameter of said opening;

whereby said valve provides a stable maintenance of pressure for low fuel flow rates through said fuel supply system.

7. Apparatus as in claim 6 further comprising:

means for yieldably urging said first and second valve elements to a closed position, whereby the stability of said valve is further enhanced.

8. Apparatus as in claim 7 further comprising:

means for limiting the downstream displacement of said first valve element.

References Cited

UNITED STATES PATENTS

| | | | |
|---|---|---|---|
| 2,488,949 | 11/1949 | Walsh | 137—102 X |
| 2,619,162 | 11/1952 | Feilden. | |
| 2,712,218 | 7/1955 | Ritter | 60—39.09 |
| 2,837,148 | 6/1958 | Jay. | |
| 2,929,394 | 3/1960 | Wenner | 137—107 |
| 2,963,082 | 12/1960 | Binford et al. | |
| 3,419,030 | 12/1968 | Gratzmuller | 137—102 |

AL LAWRENCE SMITH, Primary Examiner

U.S. Cl. X.R.

137—107; 431—29

PO-1050
(5/69)

UNITED STATES PATENT OFFICE
CERTIFICATE OF CORRECTION

Patent No. 3,498,056          Dated March 3, 1970

Inventor(s) Paul A. Avery

It is certified that error appears in the above-identified patent and that said Letters Patent are hereby corrected as shown below:

Col. 2, line 40, after "engine 10" insert "with".

Col. 4, line 15, "frusto" should read "frustro".

Col. 5, line 55, "frusto" should read "frustro";

Col. 5, line 58, delete "a" before "downstream".

Col. 6, line 1, "mean" should read "means";

Col. 6, line 45, "frusto" should read "frustro".

SIGNED AND
SEALED
JUL 14 1970

(SEAL)
Attest:

Edward M. Fletcher, Jr.
Attesting Officer

WILLIAM E. SCHUYLER, JR.
Commissioner of Patents